United States Patent [19]

McMillen

[11] Patent Number: 4,621,359

[45] Date of Patent: Nov. 4, 1986

[54] LOAD BALANCING FOR PACKET SWITCHING NODES

[75] Inventor: Robert J. McMillen, Long Beach, Calif.

[73] Assignee: Hughes Aircraft Company, Los Angeles, Calif.

[21] Appl. No.: 661,995

[22] Filed: Oct. 18, 1984

[51] Int. Cl.$^4$ .......................... H04Q 11/04; H04J 3/24
[52] U.S. Cl. .......................................... 370/60; 370/94; 340/825.5
[58] Field of Search ........................ 370/60, 58, 94, 61; 340/825.5, 825.51

[56] References Cited

U.S. PATENT DOCUMENTS

| | | | |
|---|---|---|---|
| 4,271,506 | 6/1981 | Broc et al. | 370/60 |
| 4,484,326 | 11/1984 | Turner | 370/94 |
| 4,550,397 | 10/1985 | Turner et al. | 370/60 |

FOREIGN PATENT DOCUMENTS

WO84/01077 3/1984 PCT Int'l Appl. .

OTHER PUBLICATIONS

Herzog: Message-Switching Networks with Alternate Routing, Jun. 13-20, 1973, pp. 415/1-415/8, Proceedings of the International Teletraffic Congress, Stockholm, Proc. 7, Part 2, Swedish Communications 1973 (Stockholm, Sweden).
Parker et al: The Gamma Network: A Multiprocessor Interconnection Network with Redundant Paths, pp. 73-80, Conference Proceedings: the 9th Annual Symposium on Computer Architecture, Apr. 26-29, 1982, Austin, Texas.
Switching Strategies in a Class of Packet Switching Networks, M. Kumar et al; The 10th Annual International Symposium on Computer Architecture 1983, Stockholm, Sweden; pp. 284-300.
The Hybrid Cube Network, R. J. McMillen et al; Distributed Data Acquisition, Computing & Control Symposium; Dec. 1980; pp. 11-22.
P. N. Jean, S. C. Crist, M. Arozullah, "Multi-Microprocessor Based Architecture for a Space Borne Packet Switch", pp. 139-141; COMCON 80, Feb. 25-28, 1980, 20th Computer Society International Conference (San Francisco, Calif.).
L. Ciminiera and A. Serra, "LSI Implementation of Modular Interconnection Networks for MIMD Machines", 1980 Int'l. Conf. Parallel Processing, Aug. 1980, pp. 161-162.

(List continued on next page.)

Primary Examiner—Douglas W. Olms
Assistant Examiner—Wellington Chin
Attorney, Agent, or Firm—Kenneth W. Float; A. W. Karambelas

[57] ABSTRACT

A load balancing circuit arrangement for use with a packet switching node. The packet switching node processes applied data packets containing routing tag signals indicative of the output port destinations to which the data packets are addressed, and routes these packets to the identified output ports. The present invention a load balancing circuit coupled to the packet switching node which monitors the output port addresses of the applied data packets and monitors the number of data packets addressed to each of the output ports. The load balancing circuit is adapted to generate new routing tag signals identifying output port addresses which redistribute the output port load. The load balancing circuit arrangement includes a tag selection circuit coupled to the load balancing circuit and the packet switching node which selectively replaces the routing tag signals of the applied data packets with the new routing tage signals in order to redistribute and balance the output port load. The load balancing circuit comprises a minimum index circuit for generating the new routing tag signals and an adder circuit coupled thereto. The minimum index circuit combines the new routing tag signals with offset signals that modify the new routing tag signals in order to implement a predetermined output port priority scheme. The load balancing circuit arrangement may be employed in both multiple queue and multiport memory packet switching nodes employed in computer or telephone communications applications.

9 Claims, 11 Drawing Figures

OTHER PUBLICATIONS

D. M. Dias and J. R. Jump, "Analysis and Simulation of Buffered Delta Networks", IEEE Trans. Computers, vol. C-30, pp. 273-282, Apr. 1981.

A. C. Hung and M. Malek, "A 4×4 Modular Crossbar Design for the Multistage Interconnection Networks", Real-Time Systems Symp., Dec. 1981, pp. 3-12.

J. H. Patel, "Processor-Memory Interconnections for Multiprocessors", 6th Annual Int'l. Symp. Computer Architecture, Apr. 1979, pp. 168-177.

U. V. Premkumar, R. Kapur, M. Malek, G. J. Lipovski and P. Horne, "Design and Implementation of the Banyan Interconnection Network in TRAC", AFIPS 1980 Nat'l. Computer Conf., Jun. 1980, pp. 643-653.

H. J. Siegel and R. J. McMillen, "The Multistage Cube: A Versatile Interconnection Network", Computer, vol 14, pp. 65-76, Dec. 1981.

R. J. McMillen, G. B. Adams III, and H. J. Siegel, "Performance and Implementation of 4×4 Switching Nodes in an Interconnection Network for PASM", 1981 Int'l Conf. on Parallel Processing, Aug. 1981, pp. 229-233.

R. J. McMillen and H. J. Siegel, "The Hybrid Cube Network", Distributed Data Acquisition, Computing and Control Symp., Dec. 1980, pp. 11-22, (FIG. VI.2, p. 19).

"B. J. Smith, "Architecture and Applications of the HEP Multiprocessor Computer System", SPIE, vol. 298, Section on Real-Time Signal Processing IV, Aug. 1981, pp. 241, 248.

LOAD BALANCING FOR PACKET SWITCHING NODES

BACKGROUND OF THE DISCLOSURE

The present invention relates generally to packet switching nodes employed in multi-processor and parallel computer systems, and the like, and more particularly to a load balancing circuit arrangement for use in such packet switching nodes which redistributes incoming data packets to its output ports for more efficient processing.

One developing area of computer technology involves the design and development of large-scale, multi-processor-based distributed and parallel computer systems. Typical of these classes of computer systems and architectural approaches are the single instruction stream, multiple data stream (SIMD) computer architecture and the multiple instruction stream, multiple data stream (MIMD) computer architecture.

A SIMD computer typically comprises a control unit, N processors, N memory modules and an interconnection network. The control unit broadcasts instructions to all of the processors, and all active processors execute the same instruction at the same time. Each active processor executes the instruction on data in its own associated memory module. The interconnection network provides a communications facility for the processors and memory modules.

A MIMD computer typically comprises N processors and N memories, and each processor can execute an independent instruction stream. Each of the processors may communicate to any other processor. Similar interconnection networks may be employed in the MIMD computer.

Various interconnection networks may be employed to interconnect processors and memories employed in either type of computer system. These interconnection networks include delta networks, omega networks, indirect binary n-cube networks, flip networks, cube networks and banyan networks, for example.

The above-cited networks are discused in some detail in the following publications: "LSI implementation of modular interconnection networks for MIMD machines," 1980 *Int'l. Conf. Parallel Processing*. Aug. 1980, pp. 161-162; "Analysis and simulation of buffered delta networks," *IEEE Trans. Computers*, Vol. C-30, pp. 273-282, April 1981; "Processor-memory interconnections for multiprocessors," 6th *Annual Int'l. Symp. Computer Architecture*, April 1979, pp. 168-177; "Design and implementation of the banyan interconnection network in TRAC," *AFIPS* 1980 *Nat'l. Computer Conf.*, June 1980, pp. 643-653; "The multistage cube: a versatile interconnection network," *Computer*, Vol. 14, pp. 65-76, Dec. 1981; "The hybrid cube network," *Distributed Data Acquisition, Computing and Control Symp.*, Dec. 1980, pp. 11-22; and "Performance and implementation of 4×4 switching nodes in an interconnection network for PASM," 1981 *Int'l Conf. on Parallel Processing*. Aug. 1981, pp. 229-233.

Several types of data switching techniques may be employed to transfer data in SIMD and MIMD computers, and the like, including packet switching, message switching, time-division circuit switching or space-division circuit switching. Packet switching involves sending one or more words of data at time through the system.

A multiple queue packet switching node is described in a presently copending patent application entitled "Packet Switched Multiple Queue NxM Switch Node and Processing Method," invented by R. J. McMillen, and assigned to the assignee of the present invention. This patent application discloses a packet switching node which processes applied data packets containing routing tag signals indicative of the output port destination to which the data packets are to be applied and transfers these packets to those output ports.

The packet switching node comprises a plurality of input ports and a plurality of output ports. A plurality of queue selectors are individually coupled to corresponding ones of the plurality of input ports. Each of the plurality of queue selectors are adapted to route data packets applied to each of the input ports in accordance with the output port destination of the data packets.

A plurality of queue sets are individually coupled to corresponding ones of the plurality of queue selectors. Each of the queue sets comprise a plurality of queues for storing and forwarding data packets applied thereto as a function of output port destination. A plurality of output arbitrators are individually coupled between corresponding ones of the plurality of output ports and the respective queue of each of the queue sets which store and forward data packets whose destinations are the corresponding output port. The output arbitrators are adapted to transfer the data packets stored in the queues to the corresponding output port in accordance with a predetermined priority arbitration scheme.

Another related presently co-pending patent application is entitled "Packet Switched Multiport Memory N×M Switch Node and Processing Method," invented by R. J. McMillen and A. Rosman, and assigned to the assignee of the present invention. This packet switching node processes applied data packets containing routing tag signals indicative of the output port destination to which the data packets are to be applied. The packet switching node comprises a plurality of input ports and output ports with a multiport memory coupled therebetween. The memory has a predetermined number of memory locations available for storage of data packets applied to each of the input ports. Control logic is coupled to the input and output ports and the multiport memory which controls the storage of data packets in the memory. The control logic also controls the routing of the data packets to the output ports in accordance with the routing tag signals.

In general, this invention comprises an N×M switch node that accepts data packets at any of N input ports and routes each to any of M output ports. The output selected is determined by the routing tag signal in the packet. The control logic is designed so that the data packets are effectively sorted according to their desired output port destination. Arbitration logic randomly, in a statistical sense, chooses among any data packets that are directed to the same output port. The algorithm implemented by the arbitration logic is designed so that data packets will not wait indefinitely to be routed from the switch node.

However, although both of these nodes improve upon the performance and throughput of conventional packet switching designs, their performance can be improved. An example will illustrate a typical problem. Assume that processor 1 applies data packets to input port 1. Assume that all output ports of the node are connected to identical execution units. Processor 1 assigns routing tag signals to each of the data packets transmitted thereby. If processor 1 continually assigns routing tag signals corresponding to output port 1, for example, then the remaining output ports are not used, and the execution units connected thereto are not used. This clearly lessens the efficiency of the node.

SUMMARY OF THE INVENTION

In order to overcome the limitations of prior art switching node designs, the present invention provides for a load balancing circuit arrangement that improves the efficiency and performance of existing packet switching nodes. In general, the load balancing circuit arrangement of the present invention comprises a logic circuit for use with a packet switching node that processes applied data packets that contain routing tag signals indicative of the output port destinations to which the data packets are addressed.

The load balancing circuit arrangement comprises a load balancing circuit coupled to the packet switching node which monitors the output port addresses of the applied data packets. In addition, the load balancing circuit monitors the number of data packets addressed to each of the output ports. The load balancing circuit is adapted to generate new routing tag signals identifying output port addresses which redistribute the output port load. The load balancing circuit arrangement includes a tag selection circuit coupled to the load balancing circuit and the packet switching node which selectively replaces the routing tag signals of the applied data packets with the new routing tag signals in order to redistribute and balance the output port load.

One embodiment of the present invention provides for a load balancing circuit arrangement for use with a multiple queue packet switching node that distributes data packets to the least full queues. This operation re-routes the data packets to output ports that are being infrequently used and hence provides for more efficient processing. A second embodiment of the load balancing circuit is provided for use with a multiport memory packet switching node.

In the first embodiment, the switching node comprises queue selection logic coupled to a plurality of queues which route the applied data packets to the desired output port destinations. The load balancing circuit arrangement for use with the multiple queue packet switching embodiment comprises the load balancing circuit coupled between a plurality of queues and their associated queue selection logic. The load balancing circuit monitors the number of data packets stored in each of the queues. The load balancing circuit is coupled to the tag selection circuit which provides input signals to the queue selection logic that replace the routing tag signals of the data packet being processed with new routing tag signals. The new routing tag signals are representative of the queue which has the fewest packets stored therein. This processing redistributes applied data packets to the least full queue and hence redistributes the output port loading of the circuit.

In the second embodiment, the switching node comprises a multiport memory and control logic which similarly route applied data packets to the desired output ports. The load balancing circuit arrangement for use in the multiport memory packet switching embodiment comprises the load balancing circuit coupled to the control logic which monitors the number and destination of the data packets stored in the multiport memory. The load balancing circuit arrangement provides input signals to the control logic which replace the routing tag signals with new routing tag signals which redistribute the applied data packets to the output ports to achieve balanced output port loading.

The load balancing circuit arrangement comprises a load balancing circuit that monitors the output port addresses of the applied data packets and the number of data packets addressed to each of the output ports. This load balancing circuit generates the new routing tag signals. A tag selection circuit coupled to the load balancing circuit selectively applys the new routing tag signals to the switching node in response to enabling signals applied thereto.

The load balancing circuit comprises a minimum index circuit for generating the new routing tag signals and an adder circuit coupled to the mimimum index circuit for combining the new routing tag signals with offset signals which modify the new routing tag signals in order to implement a predetermined output port priority scheme.

A switching node employing the load balancing circuit arrangement of the present invention may be used to construct a multistage interconnection networks which have several capabilities. The first has the ability to distribute incoming data packets over a pool of shared resources. These resources are typically identical execution or memory units connected to the output ports of the node. The second employs an extra node stage at the input of the network. Enabling the load balancing circuit in the switch nodes of the newly added stage balances the load throughout the entire multistage network.

Although the present invention is discussed with reference to its use with computer systems and architectures, it is not limited to this application. The present invention may also be used in applications involving the communications field. In particular, interconnection networks employing the present invention may be used to connect telephone systems that communicate both data and voice information by way of data packets.

BRIEF DESCRIPTION OF THE DRAWINGS

The various objects and features of the present invention may be more readily understood with reference to the following detailed description taken in conjunction with the accompanying drawings, wherein like reference numerals designate like structural elements, and in which.

DESCRIPTION OF THE PREFERRED EMBODIMENTS

Figure 1:
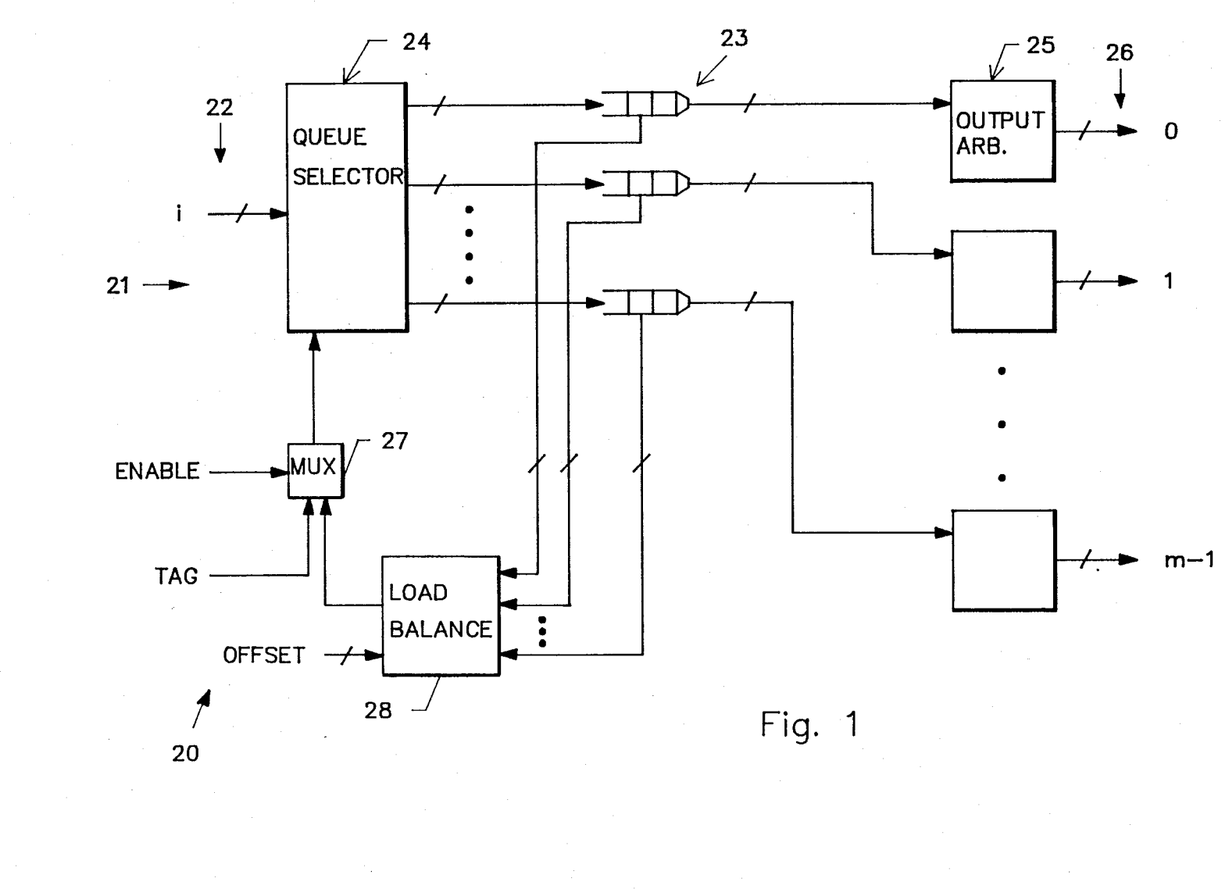
FIG. 1 illustrates a block diagram of an embodiment of a load balancing circuit in accordance with the principles of the present invention incorporated into one channel of a multiple-queue packet switching node.

Referring to FIG. 1, a block diagram of one embodiment of a load balancing circuit arrangement 20 in accordance with the principles of the present invention is shown. The load balancing circuit arrangement 20 is shown incorporated into one channel of a multiple queue packet switching node 21. This load balancing circuit arrangement 20 is made part of a single stage packet switching node 21. The packet switching node 21 processes applied data packets containing routing tag signals indicative of the output port destination to which the data packets are addressed.

One channel of the packet switching node 21 comprises an input port 22 and a plurality of output ports 26. A queue set 23 is coupled to the input port 22. The queue set 23 comprises a plurality of queues which individually process and store data packets whose destinations are a particular one of the output ports 26. A queue selector 24 is coupled between the input port 22 and each of the plurality of queues in the queue set 23. The queue selector 24 is adapted to route applied data packets arriving at the input port 22 to corresponding ones of the queues in accordance with the addresses contained in the routing tag signals.

An output arbitrator 25 is coupled between each output port and respective queues of the queue set. The output arbitrator 25 processes data packets whose destinations are the output port coupled thereto and applies the data packets stored in each of the respective queues to that output port in accordance with a predetermined priority arbitration scheme.

A more detailed description of the basic multiple queue packet switching node 21 is provided in the presently copending application entitled "Packet Switched Multiple Queue N×M Switch Node and Processing Method," cited hereinabove. This patent application is incorporated herein by this reference.

The load balancing circuit arrangement 20 is coupled between each of the queues of the queue set 23 and the queue selector 24. The load balancing circuit arrangement 20 monitors the number of data packets stored in each of the queues. The load balancing circuit arrangement 20 provides input signals to the queue selector 24 which replace the routing tag signals of the data packets currently being processed. These input signals are representative of the queue in the queue set 23 which has the fewest packets stored therein.

The load balancing circuit arrangement 20 comprises a load balancing circuit 28 coupled to the queues 23 of the packet switching node 20. The load balancing circuit 28 monitors the number of data packets addressed to each of the output ports 26 by examining the number of packets in the queue 23 associated with each output port 26. The load balancing circuit 28 is adapted to generate new routing tag signals identifying output port addresses which redistribute the output port load. A tag selection circuit 27 is coupled between the load balancing circuit 28 and the queue selector 24 which is adapted to selectively replace the routing tag signals of the applied data packets with the new routing tag signals in order to redistribute and balance the output port load.

The load balancing circuit 28 may comprise a minimum index circuit coupled to an adder circuit. The minimum index circuit is adapted to generate the new routing tag signals and the adder circuit is adapted to combine the new routing tag signals with offset signals which modify the new routing tag signals in order to implement a predetermined output port priority scheme. These two circuits will be described in more detail with reference to FIG. 2. The tag selection circuit 27 may comprise a two to one multiplexer, or the like, which is adapted to selectively choose between two input signals for output to the queue selector 24.

In operation, the multiple queue packet switching node 21 employing the load balancing circuit arrangement 20 functions in the following manner. In a typical multi-processor computer application requiring load balancing, or the like, a process controller, or the like, is coupled to the input port 22. This process controller generates data and instructions which are sent to functionally identical execution units individually coupled to the output ports 26. The data and instructions are sent in data packets which are processed by the packet switching node 21. The switching node 21 provides a communications link between the process controller and the execution units.

Each data packet includes a routing tag signal identifying the particular output port 26, and hence the particular execution unit, to which the packet is to be sent. In addition, the data packet also includes data that is to be operated upon in that execution unit. A data packet enters the switching node 21 and the queue selector 22 reads the routing tag signal. It then routes the data packet to the appropriate queue of the queue set 23 which processes signals whose destinations are the particular output port 26 corresponding to the routing tag signal.

In the multi-processor computer of this example, each of the output ports are connected to functionally identical execution units. Therefore, it is not particularly important where the instructions contained in the data packets get executed, but that they are executed in a timely manner. Since all of the execution units are functionally identical, routing tag signals may be changed in order to more efficiently utilize the execution units.

The load balancing circuit arrangement 20 produces the desired re-routing of the data packets to accomplish more efficient operation of the switching node 21 and the computer system in general. The load balancing circuit 20 processes count signals generated by each of the queues 23 in the queue set 24. The count signals indicate the number of data packets stored in a particular queue. The load balancing circuit arrangement 20 then analyzes the count signals to determine which queue has the least number of data packets stored therein. Once this has been determined, the routing tag signal in the data packet being processed by the queue selection logic 23 is changed to identify the least full queue.

Figure 2:
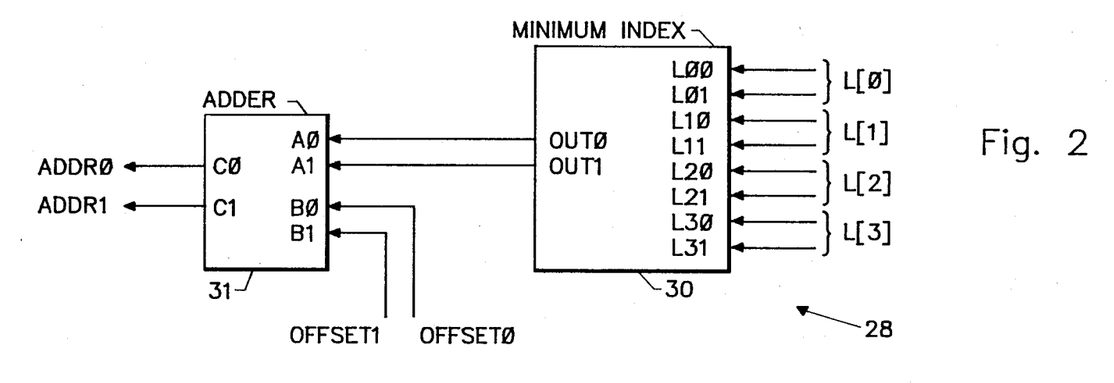
FIG. 2 illustrates a more detailed block diagram of the load balancing circuit of FIG. 1.

To better understand the operation of the load balancing circuit 20, reference is made to FIG. 2. FIG. 2 shows a more detailed block diagram of the load balancing circuit 28. The load balancing circuit 28 is comprised of the minimum index circuit 30 and an adder circuit 31. In FIG. 2, the load balancing circuit 28 is shown adapted for use with a node which comprises four output ports, hence it employs four sets of inputs to the minimum index circuit 30, identfied as L[0] to L[3].

Each set of inputs to the minimum index circuit 30 is individually coupled to count circuitry in the queues which counts the number of data packets currently being stored and processed by a particular queue. The output of the minimum index circuit 30 is coupled to a modulo M adder 31 (modulo 4 in FIG. 2) which adds an offset to the index produced. The load balancing circuit 28 implements an algorithm which determines the least full queue in the queue set. A typical algorithm is presented below.

```
1. INPUT SCALAR: OFFSET
2. INPUT ARRAY: L[M]
3. OUTPUT SCALAR: ADDR
4. BEGIN
5. minimum:=0;
6. FOR (i=1; WHILE i<M; i:=i+1)
7. IF (L[i] < L[minimum])
8. minimum:=i;
9. ENDFOR
10. ADDR: = (minimum + OFFSET) MODULO M;
11. END
```

This algorithm scans the inputs L[M] from low order to high, looking for the smallest value. In the case of a tie, the value is retained, thus implementing a particular priority scheme. This priority scheme is as follows. Since there can be a tie between two or more queues for the lowest number, a default priority is assigned. Let L[0] be the first input to the minimum index circuit 30 and let L[M-1] be the last input. In the case of a tie, L[0] has the highest priority and L[M-1] has the lowest.

Alternatively, if the first queue is not to have the highest priority, rather queue i, $0<i<M$, then the queue i data packet count is connected to L[0], the queue with the next highest priority is connected to L[1], and so on. In addition, in order to obtain the correct re-routing tag signal, the binary representation of i is connected to the OFFSET input to the modulo M adder 31. To convert this algorithm into a logic circuit requires the specification of the maximum queue size and the number of output ports (M), in order to determine the number of input and output bits in the load balancing circuit 28.

The ability to specify priority is important. In an $N \times M$ packet switching node, for example, N of the load balancing circuits are required. If all circuits gave top priority to the lower numbered outputs, there would be a bias in the overall operation of of the switching node favoring these outputs. The distribution of the load over the outputs would not be uniform.

To illustrate how the load balancing circuit 28 is reduced to logic, assume a four by four packet switching node with queues that can hold up to three data packets. Therefore, the number of input ports N=4 and the number of output ports M=4, and the number of data packets P=3. The equation $\lceil Log_2(P+1) \rceil = \lceil Log_2(3+1) \rceil = 2$ represents the number of bits required to indicate the data packet count in any queue. Since there are four queues, a total of eight inputs are needed for the minimum index circuit 30. Also, $log_2 M = 2$ bits are required to indicate the which queue is to be selected. Therefore, each input to the minimum index circuit 30, represented by L[i], is represented by two bits, Li1 and Li0, and ADDR and OFFSET are represented by two bits each, ADDR1, ADDR0, and OFFSET1, OFFSET0, respectively.

The load balancing circuit 28 comprises two parts, the minimum index circuit 30 and the modulo four adder 31 which combines the output of the minimum index circuit 30 with the OFFSET value. A modified algorithm is required to implement the minimum index circuit only, and is presented below.

```
1. INPUT ARRAY: L[M]
2. OUTPUT SCALAR: OUT
3. BEGIN
4. minimum:=0;
5. FOR (i=1; WHILE i<M; i:=i+1)
6. IF (L[i] < L[minimum])
7. minimum:=i;
8. ENDFOR
9. OUT:=minimum;
10. END
```

This algorithm has been programmed into a computer to generate a truth table with eight boolean input variables and two boolean output variables. This truth table was then made the input to a program which generated the following "sum-of-product" form logic equations. These equations correspond directly to a two level nand gate implementation of the minimum index circuit 30.

$$OUT1 = \overline{L31} \cdot \overline{L30} \cdot L10 \cdot L00 + \overline{L21} \cdot \overline{L20} \cdot L10 \cdot L01$$

$$+ \overline{L21} \cdot \overline{L20} \cdot L11 \cdot L00 + \overline{L31} \cdot L11 \cdot L01$$

$$+ \overline{L31} \cdot \overline{L30} \cdot L10 \cdot L01 + \overline{L31} \cdot \overline{L30} \cdot L11 \cdot L00$$

$$+ \overline{L21} \cdot \overline{L20} \cdot L10 \cdot L00 + \overline{L21} \cdot L11 \cdot L01$$

$$+ \overline{L30} \cdot L11 \cdot L10 \cdot L01 \cdot L00$$

$$+ \overline{L20} \cdot L11 \cdot L10 \cdot L01 \cdot L00$$

$$OUT0 = \overline{L11} \cdot \overline{L10} \cdot L00 + \overline{L11} \cdot \overline{L10} \cdot L01$$

$$+ \overline{L31} \cdot \overline{L30} \cdot L20 \cdot L00 + L20 \cdot \overline{L11} \cdot L01$$

$$+ \overline{L31} \cdot \overline{L30} \cdot L20 \cdot L01 + \overline{L31} \cdot \overline{L30} \cdot L21 \cdot L00$$

$$+ \overline{L31} \cdot L21 \cdot L01 + L21 \cdot \overline{L11} \cdot L01$$

$$+ L21 \cdot \overline{L10} \cdot L01 \cdot L00 + \overline{L30} \cdot L21 \cdot L20 \cdot L01 \cdot L00$$

Figure 3A:
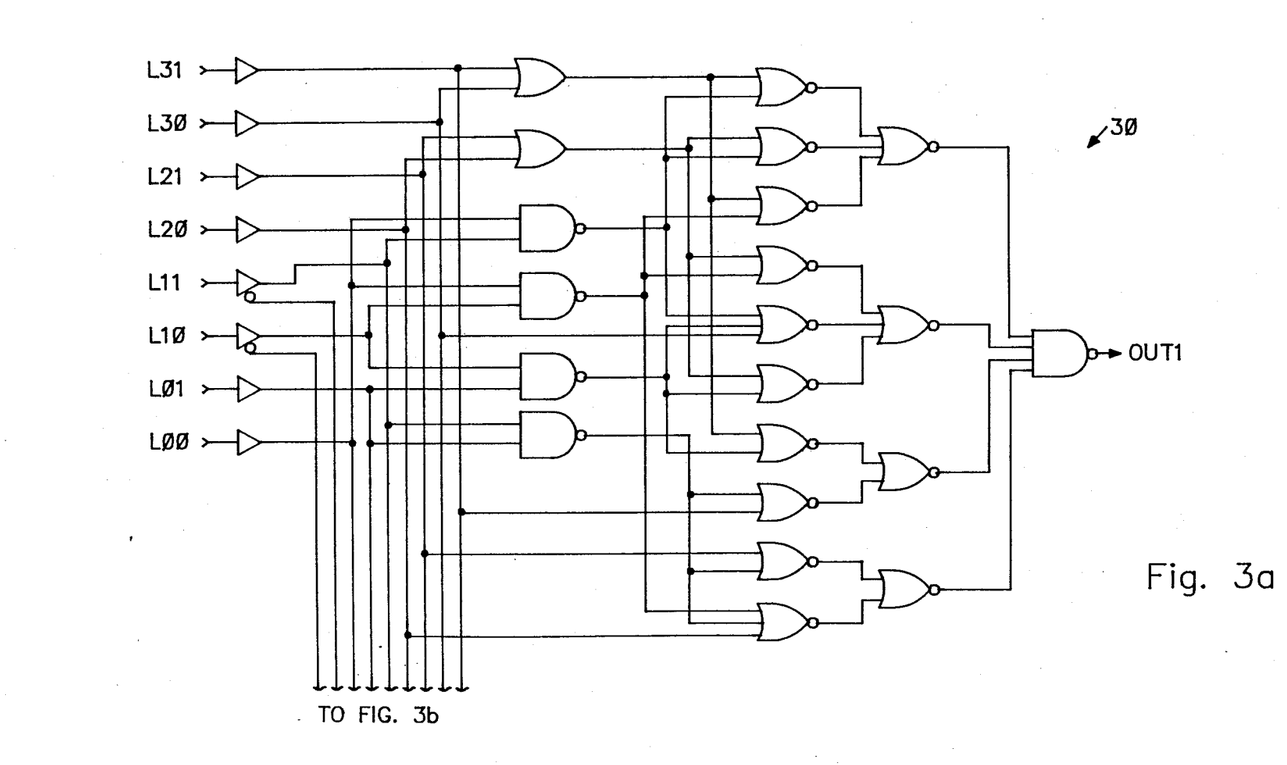
FIGS. 3a and 3b comprise a detailed schematic of the logic contained in the minimum index circuit of the load balancing circuit of FIG. 2.
Figure 3B:
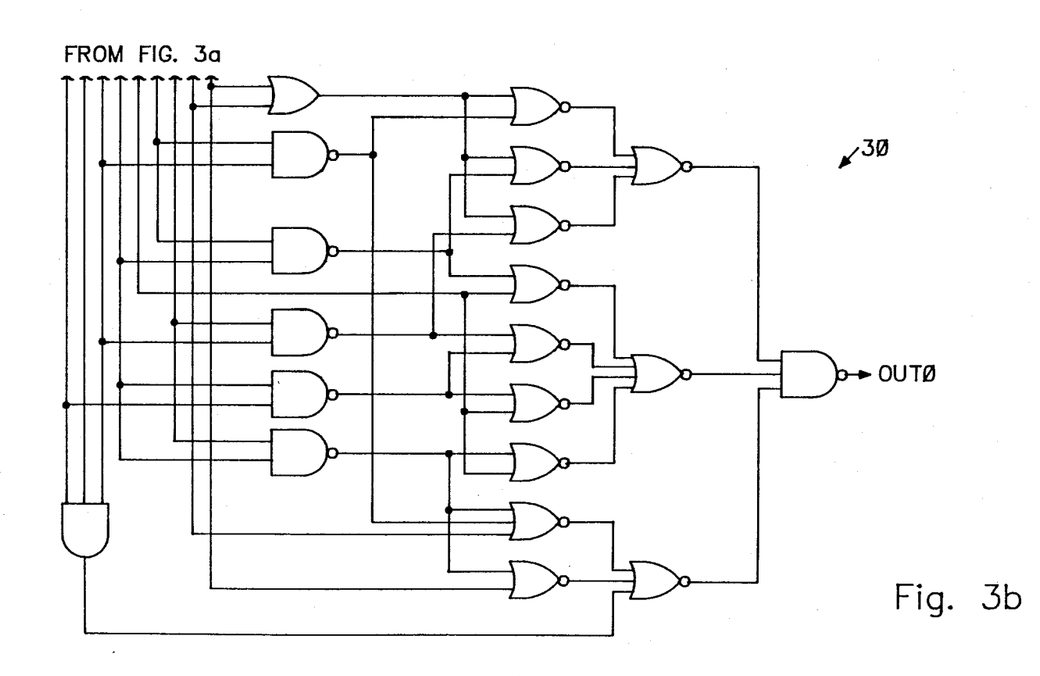

A detailed schematic of the logic diagram representing a specific embodiment of the minimum index circuit 30 is shown in FIG. 3. FIG. 3 is comprised of FIGS. 3a and 3b. FIGS. 3a and 3b should be placed abutting one another and obtained along the line of separation in order to obtain the complete drawing.

The "sum-of-product" form of the equations for the modulo four adder 31 are as follows.

$$C1 = B1 \cdot \overline{A1} \cdot \overline{A0} + B1 \cdot \overline{B0} \cdot \overline{A1} + \overline{B1} \cdot \overline{B0} \cdot A1$$

$$+ \overline{B1} \cdot A1 \cdot \overline{A0} + \overline{B1} \cdot B0 \cdot \overline{A1} \cdot A0 + B1 \cdot B0 \cdot A1 \cdot A0$$

$$C0 = B0 \cdot \overline{A0} + \overline{B0} \cdot A0 = B \oplus A$$

Figure 4A:
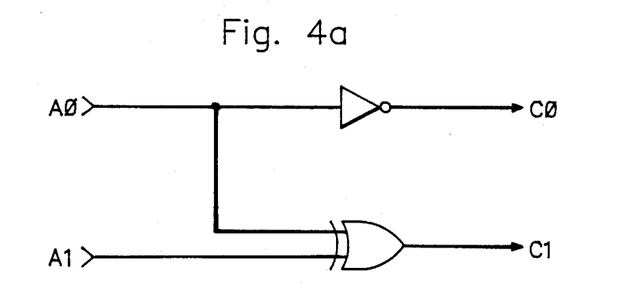
FIGS. 4a, 4b and 4c show detailed schematics illustrating the logic contained in the modulo four adder of the load balancing circuit of FIG. 2 for three priority conditions.
Figure 4B:
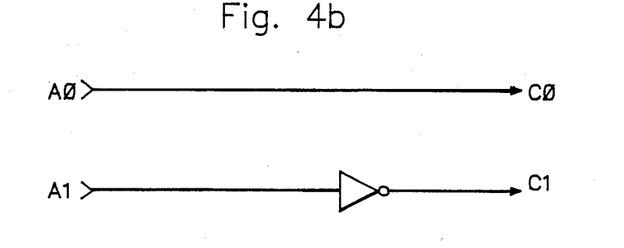
Figure 4C:
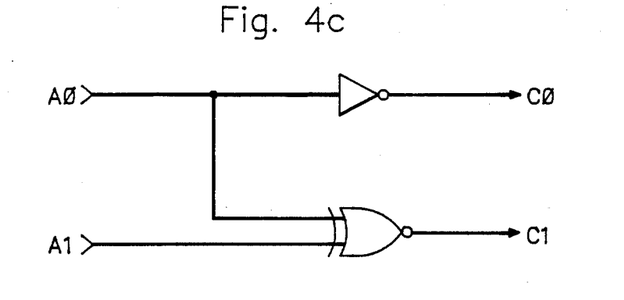

Since the B input is the OFFSET constant, once the constant is selected, it is substituted into the above equations which results in simpler circuits. If the OFFSET=0, no circuit is required. FIGS. 4a, 4b and 4c show the circuits to be used when the OFFSET is 1, 2 and 3, respectively. A detailed discussion of the components and wiring of the circuit of FIGS. 3 and 4 will be dispensed with.

Figure 5A:
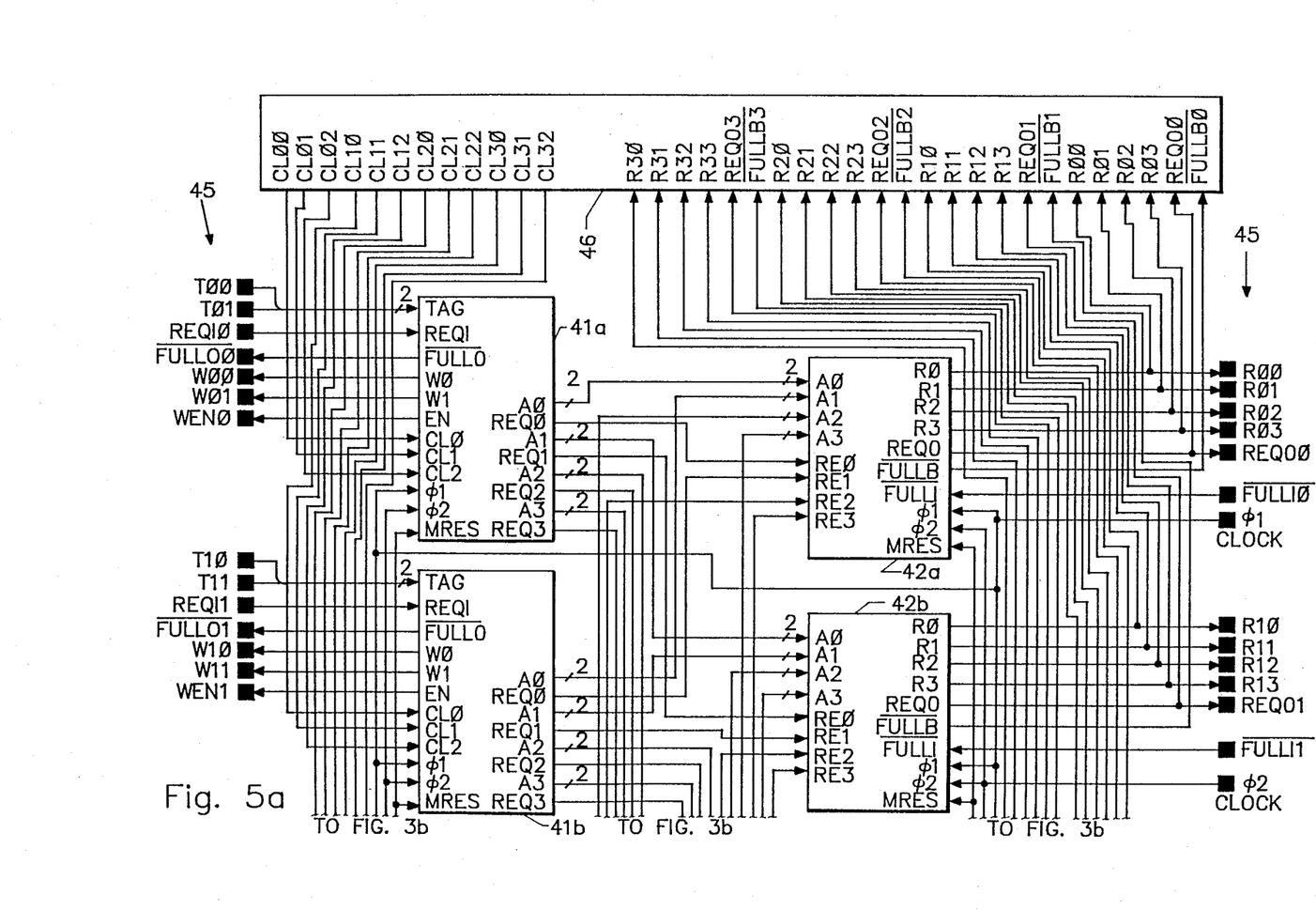
FIGS. 5a and b comprise a detailed block diagram of a multiport memory packet switching node without load balancing.
Figure 5B:
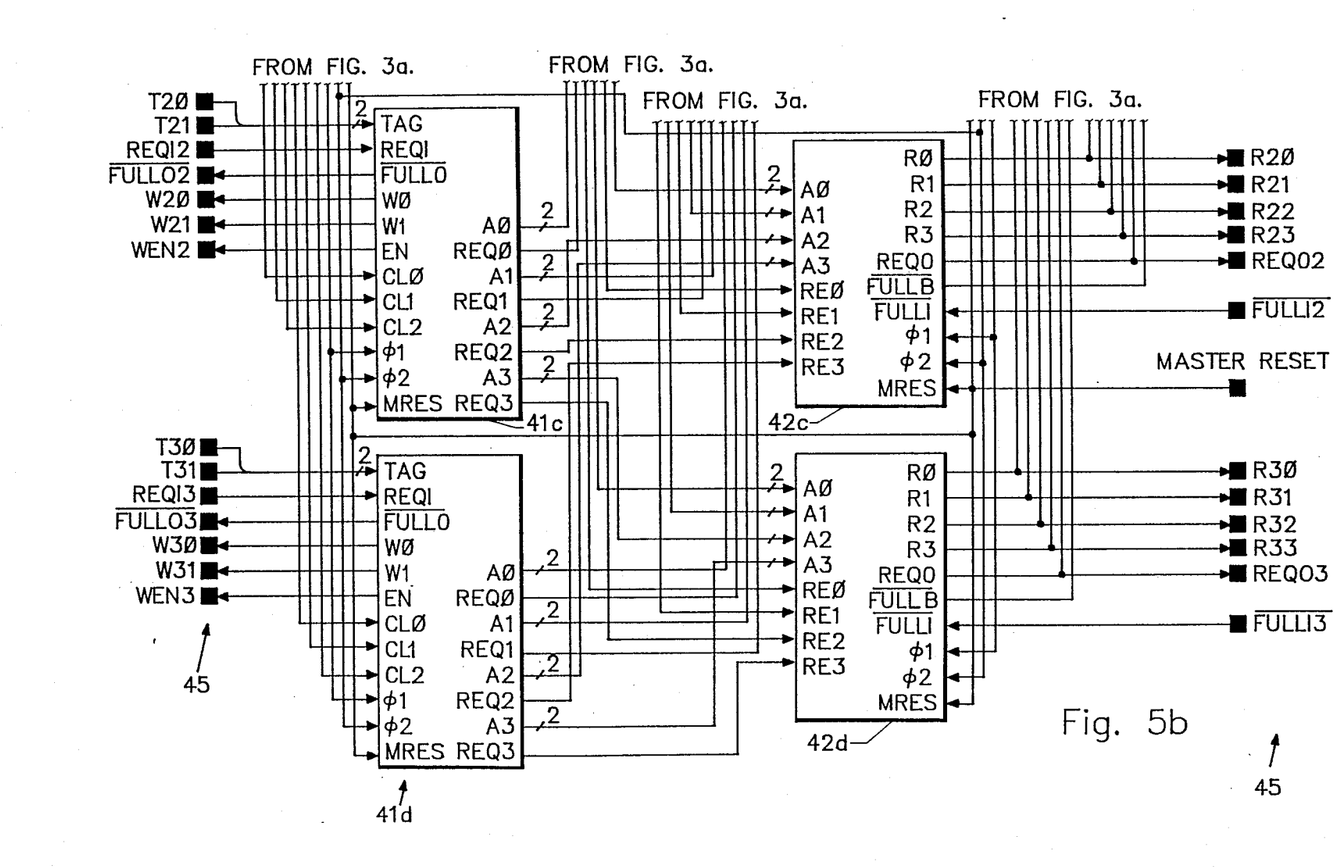

The load balancing circuit arrangement of the present invention may also be incorporated into a multiport memory packet switching node. FIG. 5 illustrates a portion of a four input, four output multiport memory packet switching node without load balancing. This circuit is identical to the circuit of FIG. 3 of the presently copending multiport memory patent application cited hereinabove. FIG. 5 shows control logic 40 of the multiport memory packet switching node. The control logic comprises four input port logic sections 41a–d coupled to four output port logic sections 42a–d. In addition handshaking signal lines 45 and status update control logic 46 are included in FIG. 5.

Figure 6:
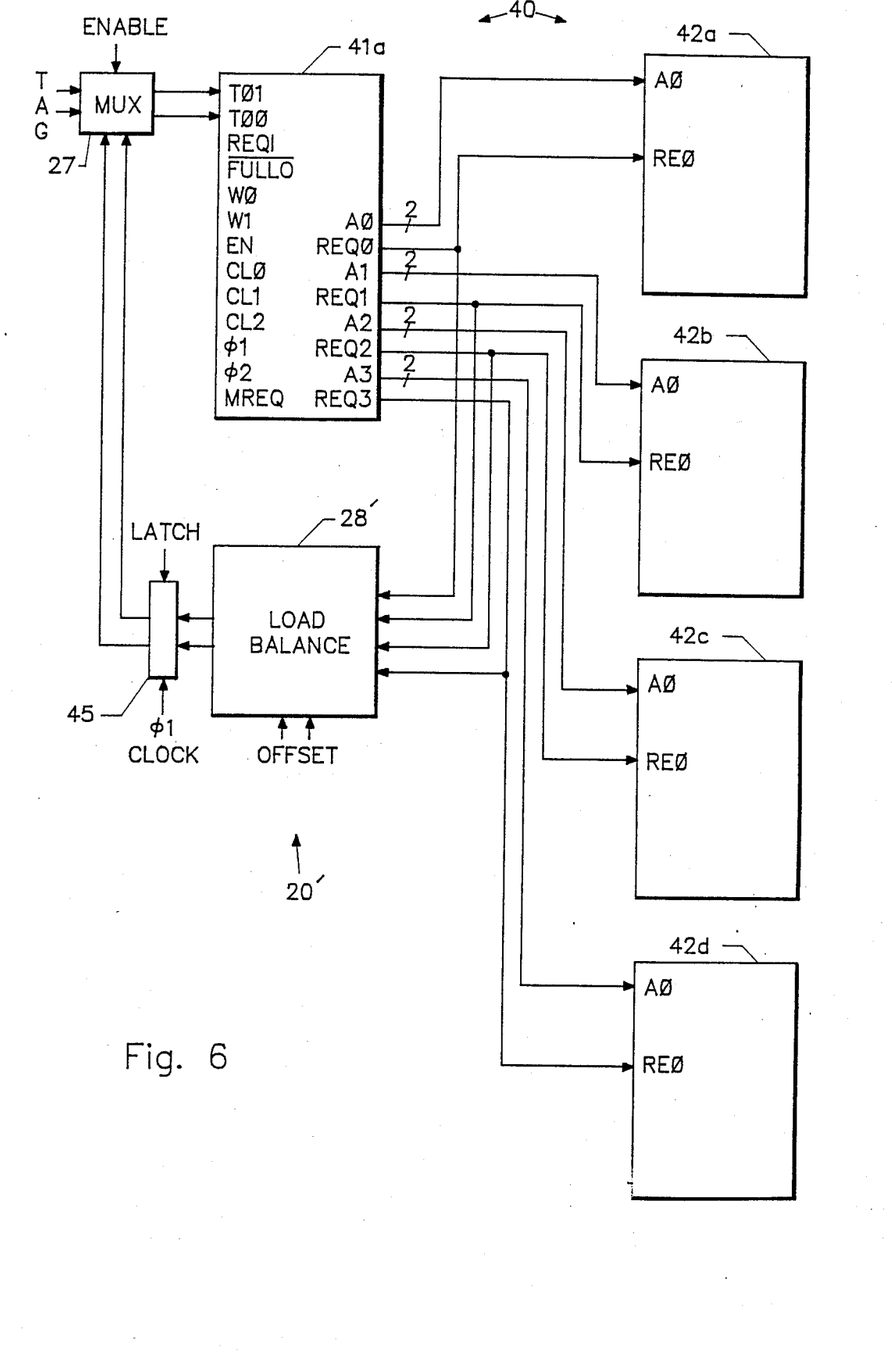
FIG. 6 illustrates the load balancing circuit of the present invention coupled to one channel of the multiport memory packet switching node of FIG. 5.

Referring to FIG. 6, there is shown a portion of one channel of the multiport memory packet switching node of FIG. 5 incorporating a load balancing circuit arrangement 20' of the present invention. The discussion of this embodiment is undertaken with reference to the presently copending patent application entitled "Packet Switched Multiport Memory N×M Switch Node and Processing Method" cited hereinabove with particular reference to FIG. 3 thereof.

FIG. 6 shows a portion of the control logic 40 which includes an input port logic section 41a coupled to four output port logic sections 42a–d. A more detailed understanding of the complete circuit will be had with reference to FIG. 3 in the previously cited patent application. The signal lines illustrated in FIG. 6 of this application correspond to signal lines described in FIG. 3 of the copending patent application.

Figure 7:
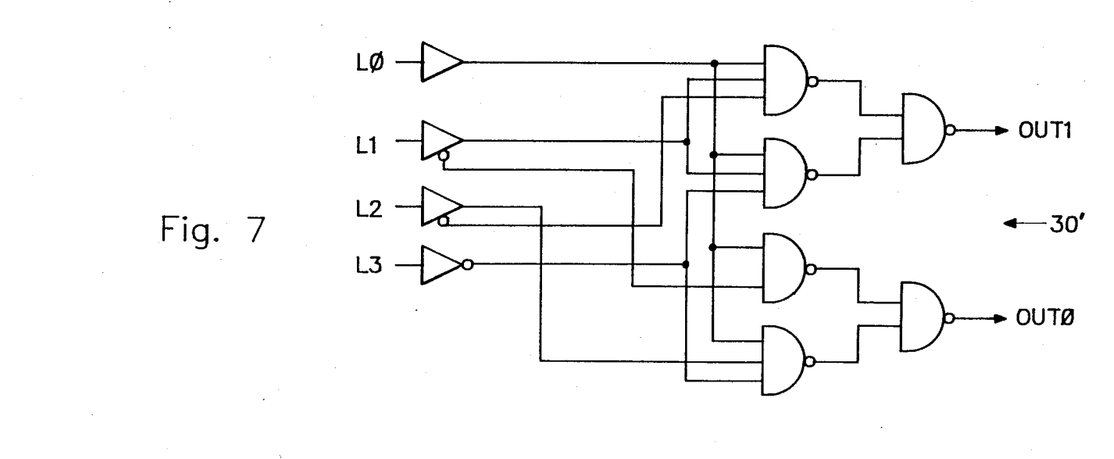
FIG. 7 illustrates a minimum index circuit for use in the load balancing circuit of FIG. 6.

The load balancing circuit arrangement 20' has inputs coupled to request output lines REQ0, REQ1, REQ2 and REQ3 of the input port logic section 41. Outputs of the load balancing circuit arrangement 20' are coupled to a latch 45 which is used to ensure correct signal timing and then to the enabling circuit 27. A load balancing circuit 28' comprises a minimum index circuit 30' and the adder 31. The minimum index circuit 30' for use in this embodiment is shown in more detail in FIG. 7. The adder circuit 31 is substantially the same as hereinabove described with reference to the load balancing circuit arrangement for the multiple queue node.

Thus, there has been described a load balancing circuit for use with a packet switching node which may be employed in multi-processor and parallel computer systems, and the like. The load balancing circuit may be used to automatically redistribute data packets to external execution units coupled to a multiple queue or multiport memory switching node. This redistribution results in more efficient operation of the node and computer system employing networks incorporating the load balancing circuit.

It is to be understood that the above-described embodiments are merely illustrative of some of the many specific embodiments which represent applications of the principles of the present invention. Clearly, numerous and varied other arrangements may be readily devised by those skilled in the art without departing from the spirit and scope of the invention. In particular, the present invention may also be used in applications involving the communications field. Interconnection networks employing the principles of the present invention may be used to connect telephone systems that communicate both data and voice information by way of data packets.

What is claimed is:

1. A load balancing circuit arrangement for use with a packet switching node that processes applied data packets that contain routing tag signals indicative of the output port destinations to which said data packets are addressed, wherein said load balancing arrangement comprises:

load balancing means coupled to said packet switching node for monitoring the output port addresses of said applied data packets and the number of data packets addressed to each of said output ports, and for generating new routing tag signals identifying output port addresses which are adapted to redistribute the output port load; and tag selection means coupled to said load balancing means and said packet switching node for selectively replacing the routing tag signals of said applied data packets with said new routing tag signals in order to redistribute and balance the output port load.

2. The load balancing circuit arrangement of claim 1 wherein:

said load balancing means comprises a logic circuit which monitors the output port addresses of said applied data packets and the number of data packets addressed to each of said output ports, and generates said new routing tag signals; and said tag selection means comprises a logic circuit for selectively applying said new routing tag signals to said switching node in response to enabling signals applied thereto.

3. The load balancing circuit arrangement of claim 2 wherein said load balancing means comprises:

a minimum index circuit for generating said new routing tag signals; and an adder circuit coupled to said minimum index circuit for combining said new routing tag signals with offset signals which modify said new routing tag signals in order to implement a predetermined output port priority scheme.

4. A load balancing circuit arrangement for use with a switching node that processes applied data packets containing routing tag signals indicative of the output port destinations to which said data packets are addressed, and wherein said switching node comprises a multiport memory and control logic coupled thereto for routing applied data packets in accordance with the output port destination thereof, wherein said load balancing circuit arrangement comprises:

load balancing means coupled to said control logic for monitoring the output port addresses of said applied data packets and the number of data packets addressed to each of said output ports, and for generating new routing tag signals identifying output port addresses which are adapted to redistribute the output port load; and tag selection means coupled to said load balancing means and said control logic for selectively replacing the routing tag signals of said applied data packets with said new routing tag signals in order to redistribute and balance the output port load.

5. The load balancing circuit arrangement of claim 4 wherein:

said load balancing means comprises a logic circuit which monitors the output port addresses of said applied data packets and the number of data packets addressed to each of said output ports, and generates said new routing tag signals; and said tag selection means comprises a logic circuit for selectively applying said new routing tag signals to said switching node in response to enabling signals applied thereto.

6. The load balancing arrangement of claim 5 wherein said load balancing means comprises:
- a minimum index circuit for generating said new routing tag signals; and
- an adder circuit coupled to said mimimum index circuit for combining said new routing tag signals with offset signals which modify said new routing tag signals in order to implement a predetermined output port priority scheme.

7. A load balancing circuit arrangement for use with a packet switching node that processes applied data packets containing routing tag signals indicative of the output port destinations to which said data packets are addressed, and wherein said switching node comprises queue selection logic coupled to a plurality of queues for routing applied data packets in accordance with the output port destination thereof, wherein said load balancing circuit arrangement comprises:
- load balancing means coupled to said plurality of queues for monitoring the number of data packets addressed to each of said output ports, and for generating new routing tag signals identifying output port addresses which are adapted to redistribute the output port load; and
- tag selection means coupled to said load balancing means and said queue selection logic for selectively replacing the routing tag signals of said applied data packets with said new routing tag signals in order to redistribute and balance the output port load.

8. The load balancing circuit arrangement of claim 7 wherein:
- said load balancing means comprises a logic circuit which monitors the output port addresses of said applied data packets and the number of data packets addressed to each of said output ports, and generates said new routing tag signals; and
- said tag selection means comprises a logic circuit for selectively applying said new routing tag signals to said switching node in response to enabling signals applied thereto.

9. The load balancing circuit arrangement of claim 8 wherein said load balancing means comprises:
- a minimum index circuit for generating said new routing tag signals; and
- an adder circuit coupled to said minimum index circuit for combining said new routing tag signals with offset signals which modify said new routing tag signals in order to implement a predetermined output port priority scheme.

* * * * *